April 4, 1961     D. R. FERRIS     2,977,774
AIR CONDITIONING UNIT FOR MOTOR VEHICLES Filed March 23, 1959     2 Sheets-Sheet 1

INVENTOR.
David R. Ferris
BY
*Otto a. Earl*
ATTORNEY

April 4, 1961  D. R. FERRIS  2,977,774
AIR CONDITIONING UNIT FOR MOTOR VEHICLES
Filed March 23, 1959  2 Sheets-Sheet 2

INVENTOR.
David R. Ferris
BY
ATTORNEY

United States Patent Office 2,977,774
Patented Apr. 4, 1961

2,977,774

AIR CONDITIONING UNIT FOR MOTOR VEHICLES

David R. Ferris, Cadillac, Mich., assignor to Kysor Heater Company, Cadillac, Mich.

Filed Mar. 23, 1959, Ser. No. 801,011

7 Claims. (Cl. 62—212)

This invention relates to improvements in air conditioning unit for motor vehicles. The principal objects of this invention are:

First, to provide an air conditioning and cooling unit particularly adapted for use on motor trucks to cool the cab of the truck which unit provides substantially constant air flow to the cab regardless of the speed of the truck on the road.

Second, to provide an air conditioning unit for trucks which may be driven from the engine of the truck or a separate gasoline engine and in which the air flow through the condenser and evaporator of the air conditioning system is maintained substantially constant regardless of the speed of motion of the truck.

Third, to provide an air conditioning unit for a motor vehicle which utilizes the relative air flow caused by movement of the vehicle to relieve the load on the air circulating fans which circulate air through the condenser and the evaporator of the air conditioner.

Fourth, to provide an air conditioning system for vehicles which is adjustable as to cooling capacity and which automatically maintains the adjusted cooling capacity regardless of changes in speed of the truck.

Fifth, to provide a novel form of electrical circuit for the air circulating fans of an air conditioning system which reduces the electrical power requirement of the fans as the speed of the vehicle increases and which acts as a brake on the fans when the air conditioning system is turned off and the vehicle is moving.

Other objects and advantages of the invention will be apparent from a consideration of the following description and claims. The drawings, of which there are two sheets, illustrate a highly practical form of the air conditioning system and two different arrangements for driving the compressor thereof.

Figures 1, 2:
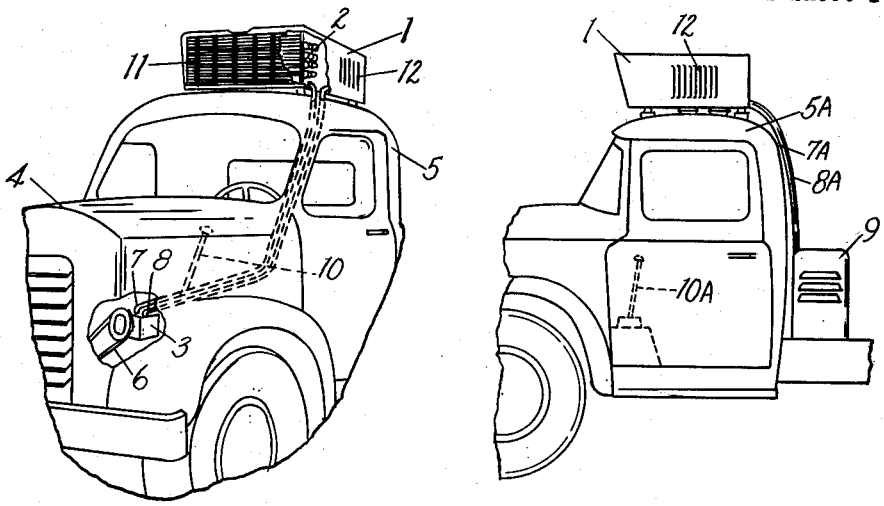
Fig. 1 is a fragmentary perspective view of the air conditioning apparatus mounted on the cab of a truck with the compressor drivingly connected to the engine of the truck. Parts of the truck and the apparatus casing are broken away to illustrate the inner parts thereof.
Fig. 2 is a fragmentary side elevational view of the air conditioning apparatus mounted on a truck with a separate power unit connected to drive the compressor of the apparatus.
Figure 3:
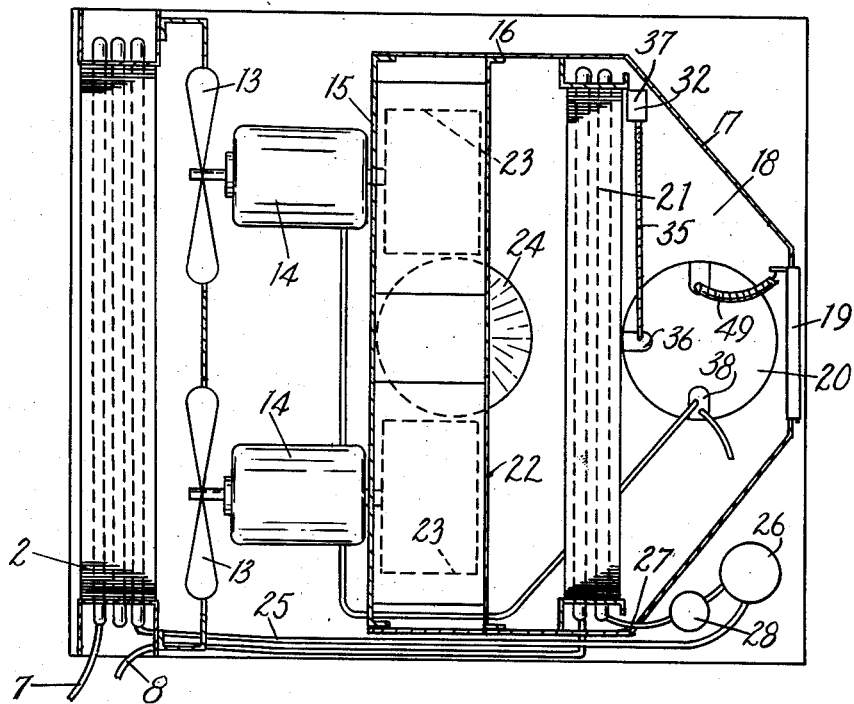
Fig. 3 is a top plan view, partially in section, of the air conditioning apparatus with the outer casing thereof removed.
Figure 4:
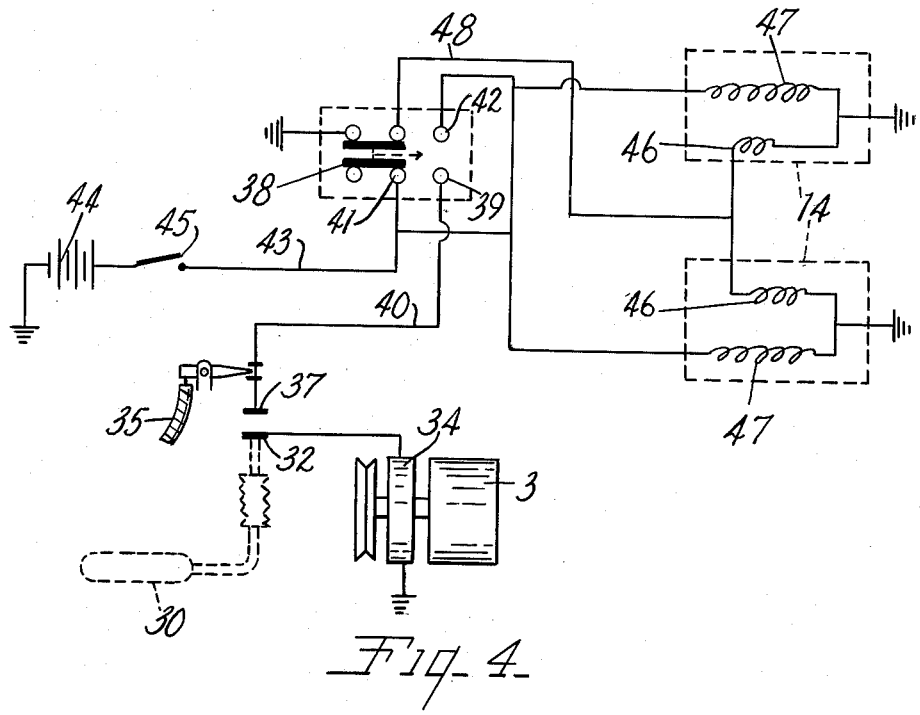
Fig. 4 is a schematic electrical wiring diagram of the electrical circuit of the apparatus shown in Figs. 1 and 3.

As shown in Figs. 1 and 2 the air conditioning apparatus of the invention is enclosed in a casing 1 designed to be mounted on the roof of the cab of a motor truck. The casing encloses the condenser 2 which cools and condenses the refrigerant gases of the system and the air circulating and air cooling elements of the system will be described in greater detail presently.

In the form of the apparatus shown in Fig. 1 the compressor 3 of the refrigerating system is mounted within the engine compartment 4 of the truck cab 5 and connected by means of the belt 6 to the engine of the truck. A high pressure discharge conduit 7 is connected between the output side of the compressor to the condenser 2. A suction line 8 is connected between the suction side of the compressor and the evaporator of the refrigeration system. The conduits or pipes 7 and 8 are mounted in suitable passages in the body of the truck.

In the example of the apparatus shown in Fig. 2 the same casing 1 has its refrigerant pipes or conduits 7A and 8A directed along the rear of the cab 5A to a separate power unit 9 which contains the compressor and an independent gasoline engine. The combination of a compressor and separate driving engine is well known and so is not illustrated in greater detail.

The speed of the trucks along the highway may vary as is well known from zero to fifty or sixty miles an hour and the speed of the engine of the truck is further variable depending upon the gear ratio selected by the driver. The transmission gear shift levers 10 and 10A illustrate conventionally the variable speed properties of the trucks and the truck engines.

The condenser 2 is mounted behind an open grill 11 in the front of the casing to be subjected to the flow of air therethrough due to forward motion of the truck at variable speeds. After passing through the condenser this air flow is diverted and directed outwardly through side louvers 12. When the vehicle is stationary or moving slowly an adequate flow of air through the condenser is assured by operation of the propeller type fans 13 mounted within the casing and driven by the electric motors 14. Positioned behind the motors 14 and within the casing are walls 15 and 16 and 17 forming a cooling chamber 18. These walls will normally be insulated against heat leakage, but since this is an old expedient it is not illustrated. At its rear end the cooling chamber 18 is provided with a fresh air inlet that is provided with regulating shutters 19 and which registers with a corresponding opening (not illustrated) in the back of the casing.

The bottom wall of the cooling chamber 18 defines an inlet hole or opening 20 which is adapted to be connected to a registering hole in the top of the truck cab for the return circulation of air from the cab to the cooling chamber. The evaporator 21 of the refrigerating system is mounted transversely across the cooling chamber ahead of the return air opening 20. Ahead of the evaporator 21, the cooling chamber 18 is provided with a fan housing 22 which encloses the rotors 23 of two centrifugal fans arranged to draw air through the evaporator from the return air opening 20 and the outside air opening depending upon the adjustment of the shutters 19. The output from the centrifugal fans or blowers 23 is directed through a delivery duct 24 opening through the bottom of the cooling chamber and connected through a suitable hole in the top of the truck cab. The centrifugal fans 23 are coaxially arranged and connected to the motors 14 to be driven thereby.

Refrigerant is directed in a heated compressed condition through the pipe 7 or 7A to the condenser 2 where it is cooled and condensed as will be understood and is delivered by the pipe 25 to a receiver 26. From the receiver 26 the liquid refrigerant is directed to the evaporator 21 by the pipe 27 under the control of a suitable expansion valve conventionally illustrated at 28. The refrigerant expands in the evaporator absorbing heat from the air passing through the evaporator and is returned to the compressor through the suction line 8.

Figure 5:
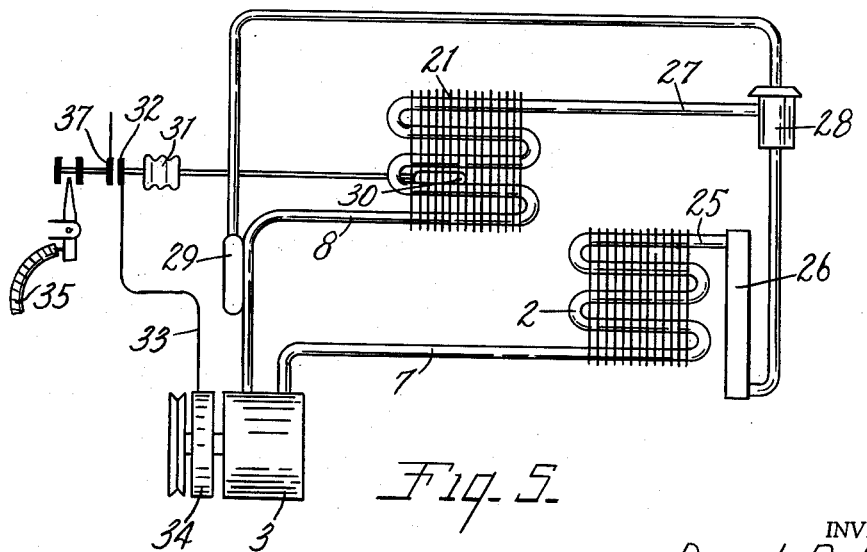
Fig. 5 is a schematic piping diagram of the refrigerant circuit and controls therefor of the apparatus shown in Figs. 1 and 3.

In order to properly meter the refrigerant to the evaporator 21 the expansion valve 28 is regulated automatically in response to the temperature in a temperature sensing device 29 mounted adjacent the outlet of the evaporator (see Fig. 5). The valve 28 and sensing device 29 are adjusted as is conventional in refrigerating circuits to open the delivery of refrigerant to the evaporator when the temperature of the refrigerant leaving the evaporator indicates a pressure caused by an excess of refrigerant. The compressor 3 is operated in response to the demand for cooling capacity as determined by a second temperature sensing device 30 also positioned to sense the temperature in the evaporator 21. The sensing device 30 actuates a mechanical switching device such as the bellows 31 and movable electric contact 32 to close an electrical circuit when the temperature in the evaporator rises to a predetermined minimum. The circuit extends through the conductor 33 to a magnetic clutch 34 that drives the compressor from the engine of the truck. The temperature at which the bellows 31 will be effective to close the contact 32 can be selectively adjusted by the driver by means of a control cable 35 anchored on an ear 36 projecting into the return air opening 20. Movement of the control cable advances the position of the contact 37 that coacts with the pressure actuated contact 32. Thus when the refrigeration system is supplying all of the cooling capacity required by the driver as indicated by the adjustment of the contact 37 the bellows 31 will intermittently open the contact 32 to disengage the clutch 34 and stop the operation of the compressor.

The electrical controls for the clutch 34 and compressor 3 are tied in electrically to a control switch 38 having one contact connected to the switch 37—32 by the conductor 40. The switch 38 has live contacts 41 and 42 connected through the conductor 43 to the battery 44 of the truck. Desirably the conductor 43 is connected to the battery through the ignition switch 45 so that the air conditioning system will not function except when the engine of the truck is being operated.

The fan motors 14 are of the shunt wound type each having an armature coil 46 and a field coil 47. The field coils 47 are constantly connected to the conductor 43 and are therefore energized whenever the ignition switch is closed. In this condition the field coils act as electrical brakes on the motors and prevent rotation of the fans 13 and 23 due to air flow past the fans 13. When the switch 38 is turned or moved to on position both the conductor 40 to the magnetic clutch and the conductor 48 to the armatures of the motors 14 are energized. In this condition the motors 14 are driven to drive both the fans 13 and 23.

Due to the shunt wound connection of the motors 14 the fans 13 and 23 will operate at their designed speed and capacity when the truck is stationary to circulate air both through the condenser and through the evaporator. It has been found that a system having sufficient capacity to cool a truck cab in hot weather will draw seven or eight amperes of current for operating the motors 14 when the truck is stationary. As the truck begins to move with increased speed the induced air flow through the condenser and over the fans 13 reduces the load on the motors and even tends to drive the motors. However, due to the shunt wound character of the motors they maintain a uniform speed and the current drawn from the batteries is reduced to about one ampere at normal highway speed of the truck. Also the speed of the centrifugal fans or blowers 23 remains substantially constant so that the flow of air circulated through the evaporator and the truck cab remains constant regardless of truck speed.

When the separate power unit 9 shown in Fig. 2 is utilized the magnetic clutch 34 and the regulating circuit therefor is not required but the same energizing circuit to the fan motors is operative to reduce the current demands on the battery of the truck and to maintain constant air flow through the cab. In either form of the apparatus the controls are conveniently arranged for operation by the truck driver. The switch 38 is mounted on a second projection in the return air opening 23 and the control cable 49 for regulating the fresh air shutters is anchored to a third projection in the return air opening along with the control cable 35 for regulating the thermostatic switch 32—37 that controls the magnetic clutch. The driver can thus start the air conditioning system by moving the switch 38 and selecting the temperature desired by actuating the control cable 35. He can determine the proportion of fresh air to be circulated in the cab by actuating the control cable 49 all by simply raising his hand to the return air opening 20 in the roof of the truck cab.

What is claimed as new is:

1. A refrigeration system for the cab of a truck having a variable speed engine comprising, a compressor mounted in the engine compartment of the truck, an electrically actuated clutch connected to drivingly connect said engine to said compressor, a casing mounted on top of said truck and having a condenser opening through the forward wall of the casing to be subject to the air flow caused by forward movement of the truck, a pair of fans mounted to draw air through said condenser in the same direction as said air flow, walls forming a cooling chamber in said casing and having an evaporator extending transversely of the chamber with an inlet opening from said cab to one side of the evaporator, means forming a fresh air inlet to said one side of said chamber and from the rear of said casing separate from the air flow through said condenser, a pair of blowers having inlets opening to said chamber on the opposite side of said evaporator from said inlet opening and having outlet ducts connected to a cooled air outlet opening to said cab, a pair of electric motors each connected to drive one of said fans and one of said blowers, pipes connecting said compressor, said condenser and said evaporator in a refrigerating circuit and having an expansion valve connected between the condenser and the evaporator, a temperature sensing device positioned to sense the temperature at the outlet of said evaporator and connected to said valve to close the valve as the temperature of the evaporator descends to slightly above freezing, a second temperature sensing device positioned to sense the temperature of said evaporator, a manually adjustable and temperature responsive switch connected to be actuated by said second device and electrically connected to the battery of the truck to engage said clutch, a circuit including a manual switch connected to energize the armatures of said motors from said battery, and another circuit connected to energize the fields of said motors from said battery independently of said last switch, said last two circuits each being connected to said battery through a common off-on switch.

2. A refrigeration system for the cab of a truck having a variable speed engine comprising, a compressor mounted in the engine compartment of the truck, an electrically actuated clutch connected to drivingly connect said engine to said compressor, a casing mounted on top of said truck and having a condenser mounted to be subject to the air flow caused by forward movement of the truck, a fan mounted to draw air through said condenser in the same direction as said air flow, walls forming a cooling chamber in said casing and having an evaporator extending transversely of the chamber with an inlet opening from said cab to one side of the evaporator, means forming a fresh air inlet to said one side of said chamber and separate from the air flow through said condenser, a blower having suction opening to said chamber on the opposite side of said evaporator from said inlet opening and having an outlet duct connected to a cooled air outlet opening to said cab, an electric motor connected to drive said fan and said blower, pipes connecting said compressor, said condenser and said evaporator in a refrigerating circuit and having an expansion valve connected between the condenser and the evaporator, a temperature sensing device positioned to sense the temperature at the outlet of said evarporator and connected to said valve to close the valve as the temperature of the evaporator descends to slightly above freezing, a second temperature sensing device positioned to sense the temperature of said evaporator, a temperature responsive switch connected to be actuated by said second device and electrically connected to the battery of the truck to engage said clutch, a circuit including a manual switch connected to energize the armature of said motor from said battery, and another circuit connected to energize the field of said motor from said battery independently of said control switch.

3. A refrigeration system for the cab of a truck having a variable speed engine comprising, a compressor mounted in the engine compartment of the truck, an electrically actuated clutch connected to drivingly connect said engine to said compressor, a casing mounted on top of said truck and having a condenser mounted therein to be subject to the air flow caused by forward movement of the truck, a fan mounted to draw air through said condenser in the same direction as said air flow, walls forming a cooling chamber in said casing and having an evaporator extending transversely of the chamber with an inlet opening from said cab to one side of the evaporator, means forming a fresh air inlet to said one side of said chamber and separate from the air flow through said condenser, a blower having a suction opening to said chamber on the opposite side of said evaporator from said inlet opening and having an outlet duct connected to a cooled air outlet opening to said cab, an electric motor connected to drive said fan and said blower, pipes connecting said compressor, said condenser and said evaporator in a refrigerating circuit and having an expansion valve connected between the condenser and the evaporator, a temperature sensing device positioned to sense the temperature at the outlet of said evaporator and connected to said valve to close the valve as the temperature of the evaporator descends to slightly above freezing, a second temperature sensing device positioned to sense the temperature of said evaporator, a temperature responsive switch connected to be actuated by said second device and electrically connected to the battery of the truck to engage said clutch, a circuit connected to energize the armature of said motor from said battery, and another circuit connected to energize the field of said motor from said battery.

4. A refrigeration system for the cab of a truck having a variable speed engine comprising, a compressor mounted in the engine compartment of the truck, an electrically actuated clutch connected to drivingly connect said engine to said compressor, a casing mounted on top of said truck and having a condenser mounted therein to be subject to the air flow caused by forward movement of the truck, a fan mounted to draw air through said condenser in the same direction as said air flow, walls forming a cooling chamber in said casing and having an evaporator extending transversely of the chamber with an inlet opening from said cab to one side of the evaporator, a blower having a suction opening to said chamber on the opposite side of said evaporator from said inlet opening and having an outlet duct connected to a cooled air outlet opening to said cab, an electric motor connected to drive said fan and said blower, pipes connecting said compressor, said condenser and said evaporator in a refrigerating circuit and having an expansion valve connected between the condenser and the evaporator, a temperature sensing device positioned to sense the temperature at the outlet of said evaporator and connected to said valve to close the valve as the temperature of the evaporator descends to slightly above freezing, a second temperature sensing device positioned to sense the temperature of said evaporator, a temperature responsive switch connected to be actuated by said second device and electrically connected to the battery of the truck to engage said clutch, a circuit connected to energize the armature of said motor from said battery, and another circuit connected to energize the field of said motor from said battery.

5. A refrigeration system for the passenger compartment of a vehicle having a variable speed engine comprising, a compressor mounted in the engine compartment of the vehicle, an electrically actuated clutch connected to drivingly connect said engine to said compressor, a casing mounted on top of said vehicle and having a condenser mounted therein to be subject to the air flow caused by forward movement of the vehicle, a fan mounted to draw air through said condenser in the same direction as said air flow, walls forming a cooling chamber in said casing and having an evaporator extending transversely of the chamber with an inlet opening from said compartment to one side of the evaporator, a second fan having a suction opening to said chamber on the opposite side of said evaporator from said inlet opening and having an outlet duct connected to a cooled air outlet opening to said compartment, an electric motor connected to drive said fans, pipes connecting said compressor, said condenser and said evaporator in a refrigerating circuit and having an expansion valve connected between the condenser and the evaporator, a temperature sensing device positioned to sense the temperature at the outlet of said evaporator and connected to said valve to close the valve as the temperature of the evaporator descends to slightly above freezing, a second temperature sensing device positioned to sense the temperature of said evaporator, a temperature responsive switch connected to be actuated by said second device and electrically connected to the battery of the truck to engage said clutch, a circuit including a manual switch connected to energize the armature of said motor from said battery, and another circuit connected to energize the field of said motor from said battery independently of said manual switch.

6. A refrigeration system for the compartment of a vehicle having a variable speed engine comprising, a compressor mounted in the engine compartment of the vehicle, an electrically actuated clutch connected to drivingly connect said engine to said compressor, a casing mounted on top of said vehicle and having a condenser mounted therein to be subject to the air flow caused by forward movement of the vehicle, a fan mounted to draw air through said condenser in the same direction as said air flow, walls forming a cooling chamber in said casing and having an evaporator extending transversely of the chamber with an inlet opening from said compartment to one side of the evaporator, a second fan having a suction opening to said chamber on the opposite side of said evaporator from said inlet opening and having an outlet duct connected to a cooled air outlet opening to said compartment, an electric motor connected to drive said fans, pipes connecting said compressor, said condenser and said evaporator in a refrigerating circuit and having an expansion valve connected between the condenser and the evaporator, means connected to said valve to regulate the valve, a temperature sensing device positioned to sense the temperature of said evaporator, a temperature responsive switch connected to be actuated by said device and electrically connected to the battery of the truck to engage said clutch, a circuit connected to energize the armature of said motor from said battery, and another circuit connected to energize the field of said motor from said battery independently of said armature.

7. A refrigeration system for the compartment of a highway vehicle comprising, an engine connected to drive the vehicle, a compressor, an electrically actuated clutch connected to drivingly connect said engine to said compressor, a casing mounted on the outside of the vehicle and having a condenser opening through the forward wall of the casing to be subject to the air flow caused by forward movement of the vehicle, a fan mounted to force air through said condenser in the same direction as said air flow, walls forming a cooling chamber in said casing and having an evaporator in the chamber with an inlet opening from said compartment on one side of the evaporator, and an outlet from the chamber to the compartment on the other side of the evaporator, a second fan positioned to force air through said evaporator and said inlet and said outlet, an electric motor connected to drive said fans, pipes connecting said compressor, said condenser and said evaporator in a refrigerating circuit and having an expansion valve connected between the condenser and the evaporator, a temperature sensing device positioned to sense the temperature at the outlet of said evaporator and connected to said valve to regulate the valve, a second temperature sensing device positioned to sense the temperature of said evaporator, a manually adjustable and temperature responsive switch connected to be actuated by said second device and electrically connected to the battery of the truck to engage said clutch, a circuit including a manual switch connected to energize the armature of said motor from said battery, and another circuit connected to energize the field of said motor from said battery independently of said last switch.

References Cited in the file of this patent

UNITED STATES PATENTS

| | | |
|---|---|---|
| Re. 21,503 | Alexander et al. | July 9, 1940 |
| Re. 24,745 | Bullock | Dec. 8, 1959 |
| 2,344,864 | Griswold | Mar. 21, 1944 |
| 2,696,084 | Kirkpatrick | Dec. 7, 1954 |
| 2,799,143 | Weigel | July 16, 1957 |
| 2,869,333 | Hoiby | Jan. 20, 1959 |
| 2,895,313 | Flick | July 21, 1959 |